United States Patent
Nelson et al.

(10) Patent No.: US 11,855,515 B2
(45) Date of Patent: Dec. 26, 2023

(54) MULTILAYER NEUTRAL BUS

(71) Applicant: Siemens Energy, Inc., Orlando, FL (US)

(72) Inventors: Thomas I. Nelson, Oviedo, FL (US); Raul Ricardo Rico, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 494 days.

(21) Appl. No.: 17/286,498

(22) PCT Filed: Nov. 30, 2018

(86) PCT No.: PCT/US2018/063314
§ 371 (c)(1),
(2) Date: Apr. 19, 2021

(87) PCT Pub. No.: WO2020/112138
PCT Pub. Date: Jun. 4, 2020

(65) Prior Publication Data
US 2021/0359573 A1 Nov. 18, 2021

(51) Int. Cl.
*H02K 5/22* (2006.01)
*H02G 5/02* (2006.01)
*H02G 5/10* (2006.01)

(52) U.S. Cl.
CPC ............ *H02K 5/225* (2013.01); *H02G 5/02* (2013.01); *H02G 5/10* (2013.01)

(58) Field of Classification Search
CPC .... H02K 3/522; H02K 5/225; H02K 2203/09; H02G 5/02; H02G 5/10
See application file for complete search history.

(56) References Cited

U.S. PATENT DOCUMENTS

| | | | |
|---|---|---|---|
| 4,436,953 A | 3/1984 | Gottlieb | |
| 5,672,920 A | 9/1997 | Donegan et al. | |
| 6,271,608 B1 * | 8/2001 | Haydock | H02K 5/225 310/260 |
| 8,664,813 B2 * | 3/2014 | Ast | H02K 3/505 310/260 |
| 2014/0000927 A1 | 1/2014 | Hashimoto et al. | |
| 2014/0061692 A1 | 3/2014 | Preuschl | |

(Continued)

FOREIGN PATENT DOCUMENTS

| | | |
|---|---|---|
| CA | 1091741 A | 12/1980 |
| CN | 102694356 A | 9/2012 |

(Continued)

OTHER PUBLICATIONS

Sheng Quanhua, Zhou Rong / Laminated Buabars 叠层功率母线.

(Continued)

*Primary Examiner* — Dang D Le
(74) *Attorney, Agent, or Firm* — Janet Diane Hood

(57) ABSTRACT

A multiplayer neutral bus that includes a plurality of conductive layers and a plurality of bushings is provided. At least a portion of the conductive layers are spaced apart from each other and form separate electrical flow paths. The conductive layers and bushings are arranged so that each bushing is electrically coupled to each of the other bushings. A method of installing the neutral bus is provided.

14 Claims, 3 Drawing Sheets

(56) References Cited

U.S. PATENT DOCUMENTS

2016/0156278 A1 6/2016 Ramm et al.
2018/0049310 A1 2/2018 Schneider et al.

FOREIGN PATENT DOCUMENTS

| CN | 103682069 A | 3/2014 |
|---|---|---|
| CN | 105655946 A | 6/2016 |
| CN | 205610151 U | 9/2016 |
| EP | 2624392 A | 8/2013 |
| JP | 2013236462 A | 11/2013 |

OTHER PUBLICATIONS

PCT International Search Report and Written Opinion of International Searching Authority dated Jul. 31, 2019 corresponding to PCT International Application No. PCT/US2018/063314 filed Nov. 30, 2018.

* cited by examiner

MULTILAYER NEUTRAL BUS

TECHNICAL FIELD

The present disclosure is directed, in general, to power generation, and more particularly to neutral bus heat loss reduction.

BACKGROUND

In large three phase generators, stator coils providing voltage and current are connected at a common neutral point where voltage is nominally zero. This common neutral point is typically referred to as a neutral bus. FIG. 1 illustrates a neutral bus arrangement 10 formed as a neutral busbar. A busbar is a metallic strip also referred to as a bar, where the bar may be formed as a monolithic structure or in segments 30, 32, 34 joined by connectors 41. The neutral busbar arrangement 10 includes a number of bushings 20, 22, 24, where bushing 20 is electrically connected to bushing 22 and bushing 22 is electrically connected to bushing 24.

Current flows along a single flow path 54 between bushing 20 and bushing 24 via bushing 22. Heat losses due to the current are problematic and can affect performance and product life span. One typical way heat is reduced is by increasing the perimeter normal to current flow of the neutral bus arrangement 10, which increases the area of the single flow path 54. Increasing the thickness of busbar 10 or changing the cross section of the neutral bus does not lower heat loses since the current mainly flows at a skin depth. The skin depth is relational to the frequency of the current and not to the thickness or cross section of the substrate.

Various cooling methods may be used to mitigate heat losses in the neutral bus. For example, air cooling or water cooling. Ambient air may be used to cool the neutral bus. A fan could be used to provide circulation of the air. Water cooling uses a circulation of water via ducts attached to the neutral bus. While air cooling is less complex and less costly than water cooling, air cooling requires a larger footprint than water cooling or is limited in its current carrying capability to smaller machines Neutral bus arrangements, generators, and power generation systems may benefit from improvements.

SUMMARY

Variously disclosed embodiments are related to a multilayer neutral bus. In one example, a multilayer neutral bus arrangement comprised a first conducting layer element, a second conducting layer element, and a plurality of bushings. At least a portion of the first conducting layer element is separated from second conducting layer element. The plurality of bushings is arranged in the first and the second conducting layer elements where each of the plurality of bushings electrically connected each other. The arrangement enables a distribution of current between the first and second conducting layer elements to reduce heat loss.

In another embodiment, a 3-phase electrical machine is provided. The electrical machine comprises three-leads to be electrically grounded, one for each phase, and the multilayer neutral bus arrangement. Each lead is connected to one of the bushings. Heat losses are reduced by the distribution of current between the first and second conducting layer elements.

In another embodiment, a method is provided. An electrical machine is connected to a multilayer neutral bus arrangement. The multilayer neutral bus arrangement comprises a plurality of connecting elements separated from each other. A plurality of bushings is arranged in the plurality of connecting elements and electrically connected each other. The connecting comprises, for each phase of an electrical machine, connecting a lead of the electrical machine to one of the bushings in the multilayer neutral bus arrangement. The neutral bus is connected to ground. Heat losses are reduced by a distribution of current between the plurality of conducting layer elements.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Figure 1:
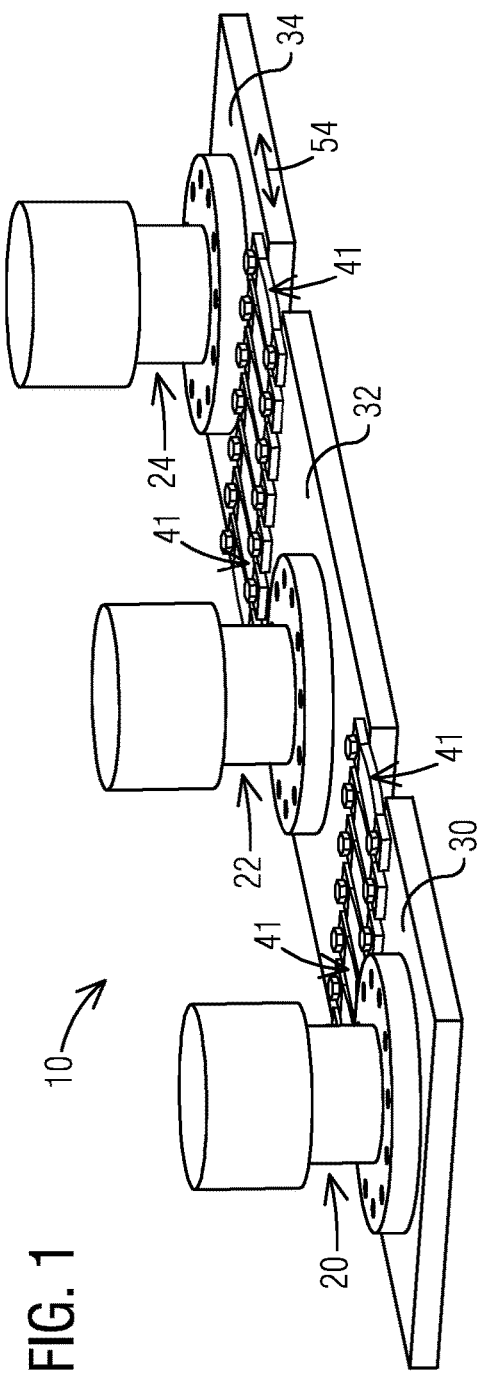
FIG. 1 illustrates a perspective view of a prior art neutral bus.

Various technologies that pertain to systems and methods that facilitate a reduced heat loss in a neutral bus will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Increasing the perimeter of the cross section of the neutral bus arrangement 10, to decrease heat loss, in turn increases the footprint of the neutral bus arrangement 10. This increase may also increase the footprint and/or complexity of the cooling of the respective neutral bus arrangement.

Embodiments of an improved neutral bus with multiple layers is disclosed. The multilayer neutral bus includes a plurality of conductive layer elements and a plurality of bushings. At least a portion of the conductive layer elements are spaced apart from each other and form separate electrical flow paths. The conductive layer elements and bushings are arranged so that each bushing is electrically coupled to each of the other bushings. For a 3-phase neutral bus arrangement, connecting each bushing to each other may be achieved, for example, by a closed series connection. The conductive layer elements include a conductive material, which may be, for example, a metal or a highly conductive composite. Copper is commonly used as the conductive material.

The conductive layer elements may be segmented, where the segments are electrically coupled by connectors. The connectors include a conductive material, for example, a metal or a conductive composite. Copper is commonly used as the conductive material.

According to an embodiment of the multilayer neutral bus, heat loss may be reduced without increasing the footprint of the neutral bus.

Various embodiments of a multilayer neutral bus are described below with reference to FIGS. 2-5.

Figure 2:
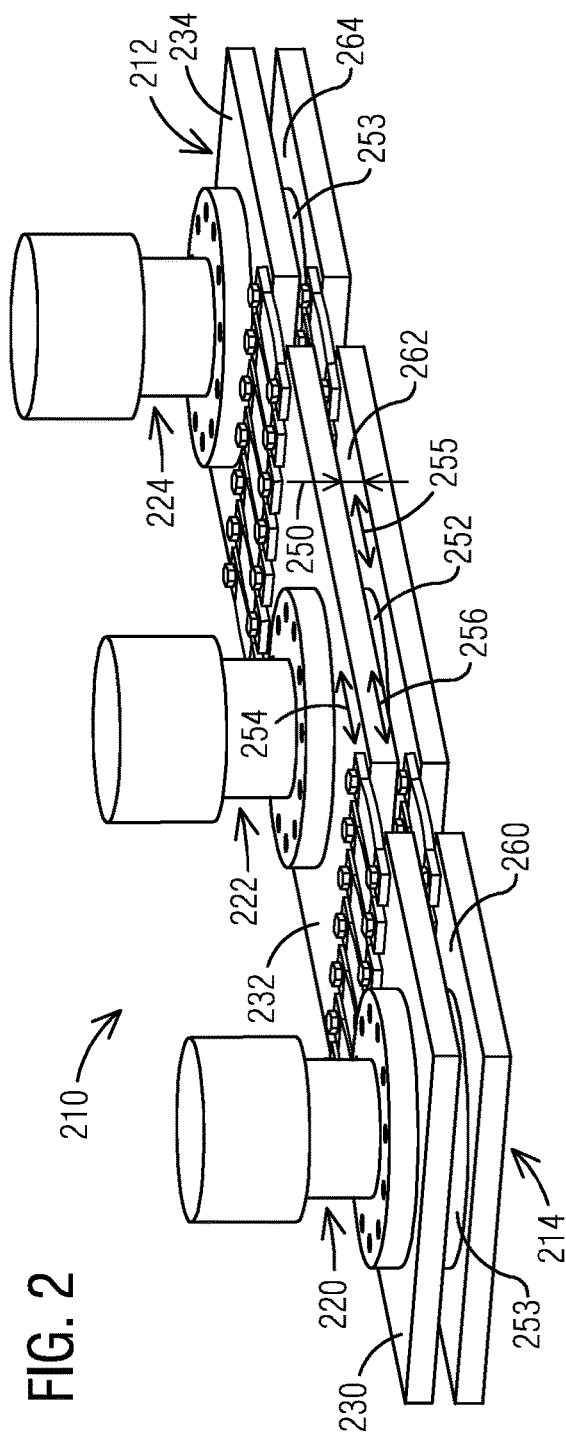
FIGS. 2-5 illustrates perspective views of different embodiments of a multilayer neutral bus.

FIG. 2 illustrates a perspective view of a 3-phase neutral bus arrangement according to an embodiment. In the illustrated embodiment, the neutral bus arrangement 210 is a multilayer busbar. A first layer comprises a first conducting layer element 212 and the second layer, which is spaced apart from the first conducting layer element 212, comprises a second conducting layer element 214. The first conducting layer element 212 and the second conducting layer element 214 may be planar and may be arranged in parallel forming a multilayer busbar 210.

For each phase, a bushing is arranged in the multilayer busbar so that each bushing is electrically coupled to each other bushing. The electrical coupling allowing the exterior surfaces of the bushings to be electrically coupled. A first bushing 220 is electrically coupled to a second bushing 222 and a third bushing 224. The second bushing 222 is electrically coupled to the first and third bushings 220, 224. The third bushing 224 is electrically coupled to the first and second bushing 220, 222.

The first conducting layer element 212 may include a plurality of conductive bar segments electrically coupled by connectors. According to the illustrated embodiment, the first conducting layer element 212 includes a conductive bar segment 230, 232, 234 for each phase. The conductive bar segments are electrically coupled by connectors to form a bar. The first bar segment 230 and the third bar segment 234 forming the ends of the bar with the second bar segment 232 arranged in between. Connectors 241 electrically couples the first bar segment 230 with the second bar segment 232, and electrically couples the second bar segment 232 with the third bar segment 234.

The second conducting layer element 214 may include a plurality of conductive bar segments. According to the illustrated embodiment, the second conducting layer element 214 includes conductive bar segments 260, 262, 264 for each phase. The conductive bar segments are electrically coupled by connectors to form a bar. The first bar segment 260 and the third bar segment 264 forming the ends of the bar with the third bar segment 262 arranged in between. Connectors 241 electrically couples the first bar segment 260 with the second bar segment 262, and electrically couples the second bar segment 262 with the third bar segment 264.

Each bushing 220, 222, 224 is mounted to one of the bar segments 230, 232, 234 in the first conducting layer element 212. The first 220 and the third bushing 224 are arranged at opposite ends of the first conducting layer element 212 with second bushing 222 being arranged between the first 220 and third bushings 224. The first 220 and third bushing 224 are each electrically connected to an end bar segment 260, 264 of the second conducting layer element 212. Each bushing 220, 222, 224 is electrically connected to each other bushing.

A current flow 254 along the first conducting layer element 212 extends to a current flow 255 along the second conducting layer element 214 by way of the arrangement. Furthermore, when a magnetic field is created between first current conducting layer element and the second connecting element, a third current flow path 256 in at least one of the conducting layer elements.

At least a portion of the first and second conducting layer elements 212, 214 are physically spaced apart via a gap 250. For example, the conducting layer elements 212, 214 are arranged parallel to each other. By way of the gap, at least one of the bushings, is not in electrical contact with the second conducting layer element 214. For example, the gap insulates the second bushing 222 from the second conducting layer element 214. By insulating the middle bushing 222 from the second conducting layer element 214 a current in the second conducting layer element 214 allows the current flow 255 to flow from end to end of the element 214.

An insulation material 252 may be included in the gap 250 insulate a bushing from the second conducting layer. Additionally, the insulating material 252 may provide structural support. For example, the insulation material 252 may electrically insulate the middle bushing 222 from the second conducting layer element 214 as well as structurally support the arrangement between the conducting layer elements 212, 214.

To facilitate the closed series connection, the first and second bushings 220, 224 arranged at opposite ends are electrically coupled to the first and second conducting layer elements 212, 214. A conductive material 253 may be arranged between end bar segments 230, 234, 260, 264 the first and second conducting layer elements at end bar segments. The conductive material 253 may provide structural support.

The arrangement enables a distribution of current between the first and second conducting layer elements. Heat losses are reduced by the distribution of current between the first and second conducting layer elements. The heat loss is reduced without a need to increase to the footprint or a minimal increase to the footprint. The arrangement enables the distribution of current between the first and second conducting layer elements to reduce heat loss without increasing the footprint or with a minimal increase of the footprint.

Figure 3:
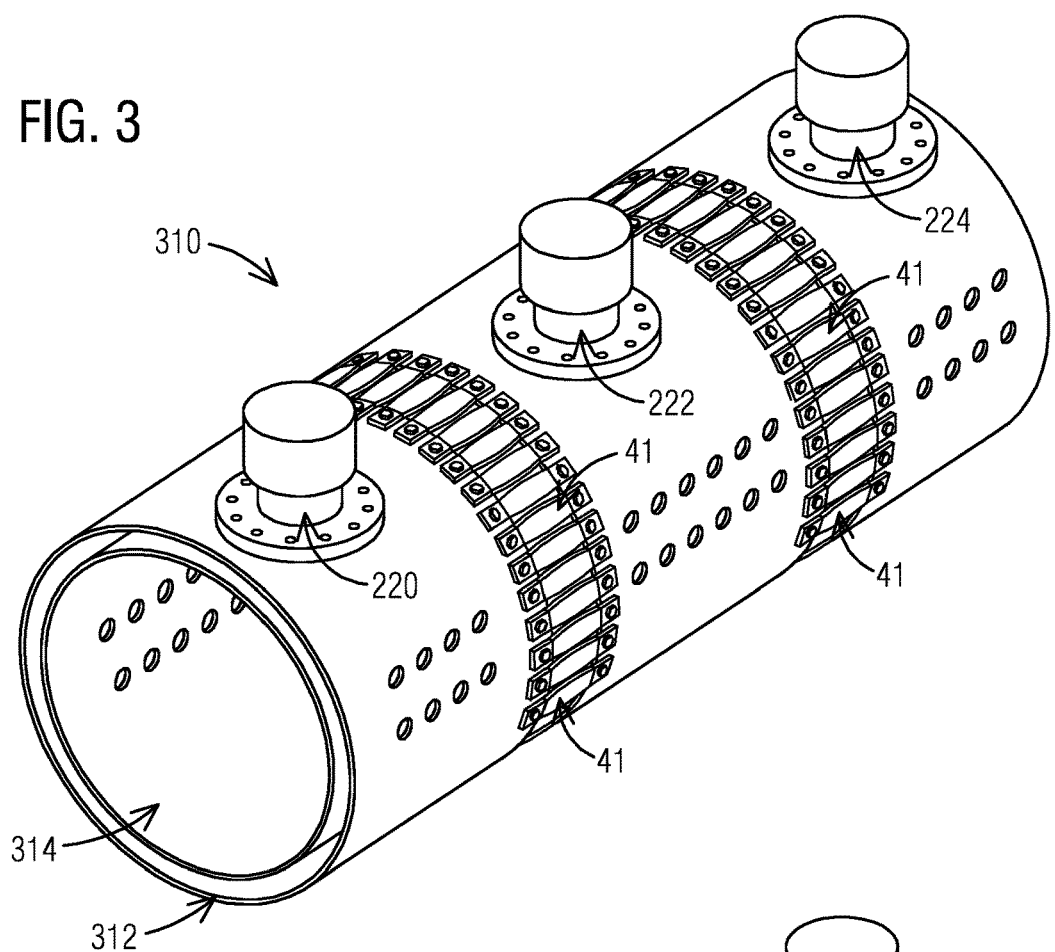

FIG. 3 illustrates another embodiment of multilayer neutral bus arrangement 310. In contrast to bars, the conducting layer elements 312, 314 are formed as tubes having different diameters. The bushings 220, 222, 224 are similarly arranged conducting layer elements 312, 314 as described in FIG. 2. Each of the bushings 220, 222, 224 is electrically connected to each other. The conducting layer elements 312, 314 are separated from each other by a gap. The gap separates the middle bushing 222 from conducting layer element 314 where the middle bushing 222 is not electrically connected to conducting layer element 314. The gap may comprise an insulating material 252 as described above for FIG. 2. A conductive material 253 may be provided as described above for FIG. 2. The first conducting layer element 312 and/or the second conducting layer element 314 may be formed as tube segments and connected via connectors as described above in FIG. 2

Figure 4:
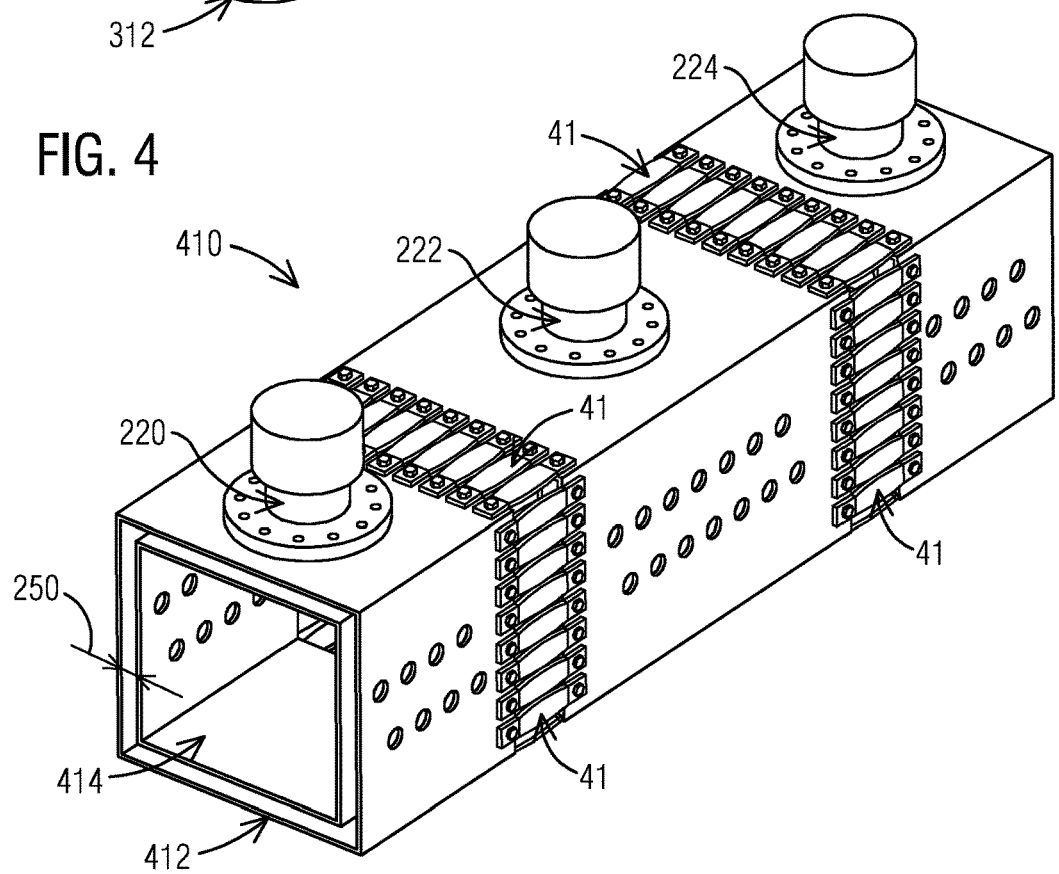

FIG. 4 illustrates another embodiment of multilayer neutral bus arrangement 410. The first conducting layer element 312 and the second conducting layer element 314, of neutral bus arrangement 310, are formed as closed polygon structures. The first and the second polygons are similarly shaped closed polygons with the second conducting layer element 414 having a smaller scale than the first conducting layer element 412 and arranged inside the first conducing element 412. The bushings 220, 222, 224 are similarly arranged conducting layer elements 412, 414 as described in FIG. 2. Each of the bushings 220, 222, 224 is electrically connected to each other. The conducting layer elements 412, 414 are separated from each other by a gap. The gap separating the middle bushing 222 from conducting layer element 414 where the middle bushing 222 is not electrically connected to conducting layer element 414. The gap may comprise an insulating material as described above for FIG. 2. A conductive material 253 may be provided as described above for FIG. 2. The first conducting layer element 312 and/or the second conducting layer element 414, of multilayer neutral bus arrangement 410, may be formed from segments and connected via connectors as described above in FIG. 2

Figure 5:
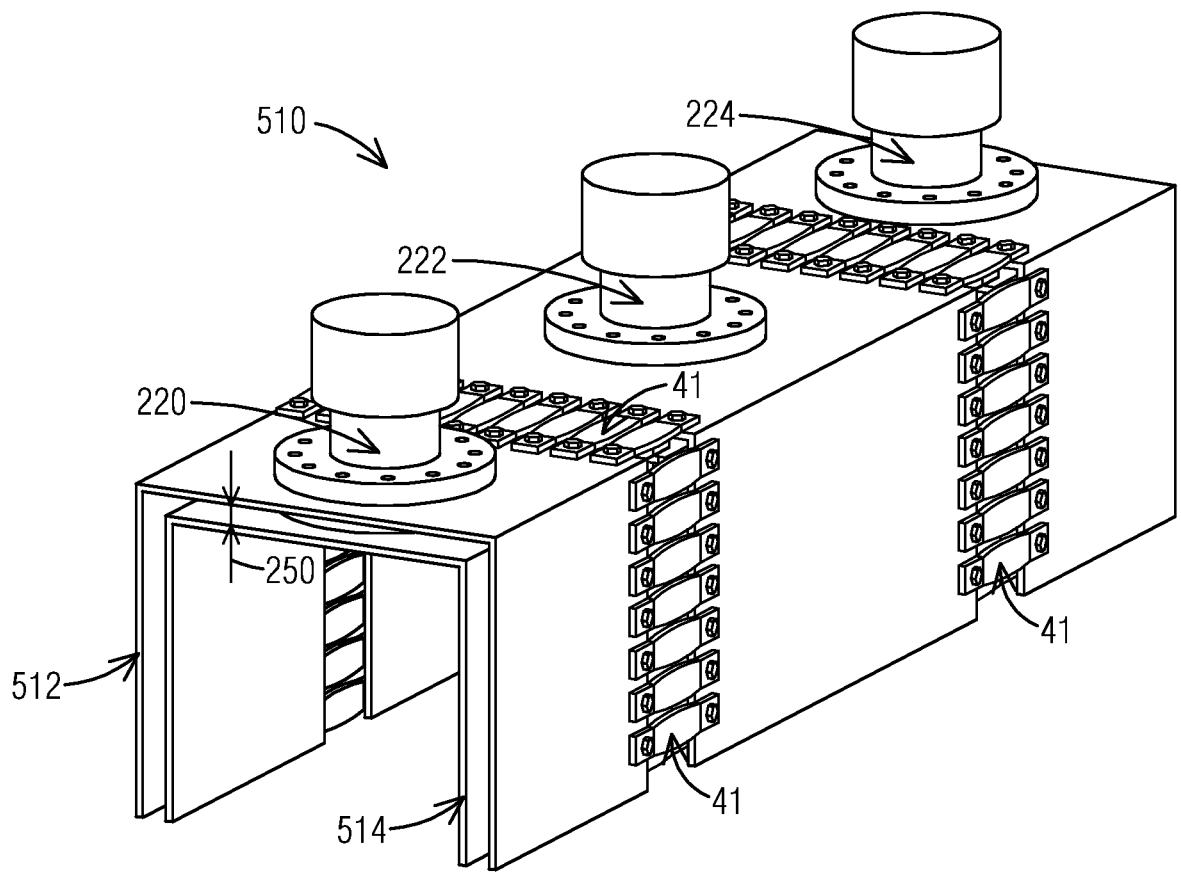

FIG. 5 illustrates further embodiments of multilayer neutral bus arrangement 510. In contrast to a closed polygon structure as illustrated in FIG. 4, the conducting layer elements 512, 514 are open polygons structures.

While the above multilayer neutral bus embodiments have been described with specific details it would be understood that these embodiments are for illustrative purposes and that other embodiments of a multilayer neutral with conductive layers and bushings arranged so that each bushing is electrically coupled to each of the other bushings would not deviate from the disclosure. For example, it has been described that each of the conducting layer elements are formed by segments connected via connectors. It would be understood that any of the conductors may be formed as a monolithic structure without the need of connectors. It would be understood that the bushings may be arranged in the monolithic structure in the same configuration as a conducting layer element formed via segments and connectors. Furthermore, each of the conducting layer elements have been described having the number of segments to match the phase. It would be understood that the number of segments may be greater or less segments the phase and that the number of segments does not need to match the phase. A one to one relation of the bushing to the segment has been described. It would be understood that a segment may have more than one bushing or no bushings. Furthermore, it would be understood that the first and second conductive elements do not have to have the same number of segments as each other.

Figure 6:
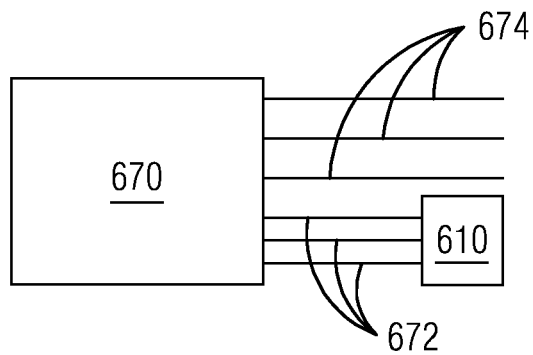
FIG. 6 illustrates a schematic view of an electrical machine according to an embodiment.

FIG. 6 is a schematic view of an electrical machine with a multilayer neutral bus arrangement according to any of the embodiments described above. A 3-phase electrical machine 670, for example a generator, comprises three leads 672 to be grounded by the multilayer neutral bus 672 and three leads 674 direct towards the grid. Each lead is connected to the multilayer neutral bus by way of one of the bushings. Heat losses are reduced by the distribution of current between the first and second conducting layer elements.

According to a method, the electrical machine is connected to a multilayer neutral bus arrangement according to any of the embodiments above. For each phase of the electrical machine, a lead of the electrical machine is connected to one of the bushings in the multilayer neutral bus arrangement. The neutral bus is to ground. Heat losses are reduced by a distribution of current between the plurality of conducting layer elements.

The method may be part of a retrofit to replace a neutral bus with the multilayer neutral bus arrangement. Accordingly, the method may comprise disconnecting the neutral bus from the electrical machine prior to the connecting the electrical machine to the multilayer neutral bus. Heat loss may be reduced by the multilayer neutral bus without increasing the footprint according the first neutral bus.

It should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

Although an exemplary embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A multilayer neutral bus arrangement comprising: a first conducting layer element
   a second conducting layer element, at least a portion of the first conducting layer element is separated from second conducting layer element; and
   a plurality of bushings arranged in the first and the second conducting layer element, each of the plurality of bushings electrically connected each other via the neutral bus arrangement;
   wherein a magnetic field is created between the first current conducting layer element and the second connecting element,
   wherein the first conducting layer element comprises a first current flow path, the second conducting layer element comprises a second current flow path and the magnetic field creates a third current flow path in at least one of the conducting layer elements,
   wherein there are three bushings;
   wherein the first conducting layer element and the second conducting layer element are connected to each other via a closed conductive loop;

wherein the plurality of bushings is three, a first bushing, a second bushing and a third bushing, where the second bushing is arranged between the first and second bushings;

wherein each of the bushings is electrically connected to the first conducting layer element;

wherein the first bushing and third bushing are electrically connected to the second conducting layer element; and wherein the second bushing is electrically insulated from the second conducting layer element.

2. A multilayer neutral bus arrangement according to claim 1, wherein a gap between the first and second conducting layer elements contributes to the third bushing being electrically insulated from the second conducting layer element.

3. A multilayer neutral bus arrangement according to claim 1, wherein an insulative material is provided between the first and second conducting layer elements contributes to the third bushing being electrically insulated from the second conducting layer element.

4. A multilayer neutral bus arrangement according to claim 1, wherein a conductive material is provided between the first and second conducting layer elements so the first and second bushings are in electrical contact with the first and second conducting layer elements.

5. A multilayer neutral bus arrangement according to claim 1 wherein at least one of the bushings is electrically insulated from the second conducting layer element.

6. A multilayer neutral bus arrangement according to claim 1, wherein the arrangement enables the distribution of current between the first and second conducting layer elements to reduce heat loss without increasing footprint.

7. A multilayer neutral bus arrangement according to claim 1, wherein the first and the second conducting layer element are planar and arranged in parallel, and wherein neutral bus arrangement is a multilayer busbar.

8. A multilayer neutral bus arrangement according to claim 1, wherein the second conducting layer element is arranged at least partially inside the first conducting layer element.

9. A multilayer neutral bus arrangement according to claim 8, wherein the second conducting layer element is arranged fully inside the first conducting layer element.

10. The multilayer neutral bus arrangement according to claim 8, wherein the first and the second conducting layer element are polygons, and wherein the first and the second polygons are similar with the second having a smaller scale and arranged inside the first conducing element.

11. A 3-phase electrical machine, comprising:

three-leads to be electrically grounded, one for each phase, and the multilayer neutral bus arrangement according to any of the claims above, wherein each lead is connected to one of the bushings, and wherein heat losses are reduced by the distribution of current between the first and second conducting layer elements.

12. An electrical machine according to claim 11 wherein the electrical machine is a generator.

13. A method, comprising:

connecting an electrical machine to a multilayer neutral bus arrangement according to claim 1, the multilayer neutral bus arrangement comprising a plurality of connecting elements separated from each other, a plurality of bushings arranged in the plurality of connecting elements and electrically connected each other, the connecting comprising, for each phase of an electrical machine, connecting a lead of the electrical machine to one of the bushings in the multilayer neutral bus arrangement; and connecting the neutral bus to ground, wherein heat losses are reduced by a distribution of current between the plurality of conducting layer elements.

14. The method according to claim 11, comprising disconnecting a first neutral bus from the electrical machine prior to the connecting, wherein the connecting the electrical machine to the multilayer neutral bus arrangement replaces the first neutral bus, wherein a heat loss is reduced by the multilayer neutral bus without increasing the footprint according the first neutral bus.

* * * * *